(No Model.)
J. H. STAHL.
BELT GUIDE FOR TRACTION ENGINES.
No. 531,881. Patented Jan. 1, 1895.
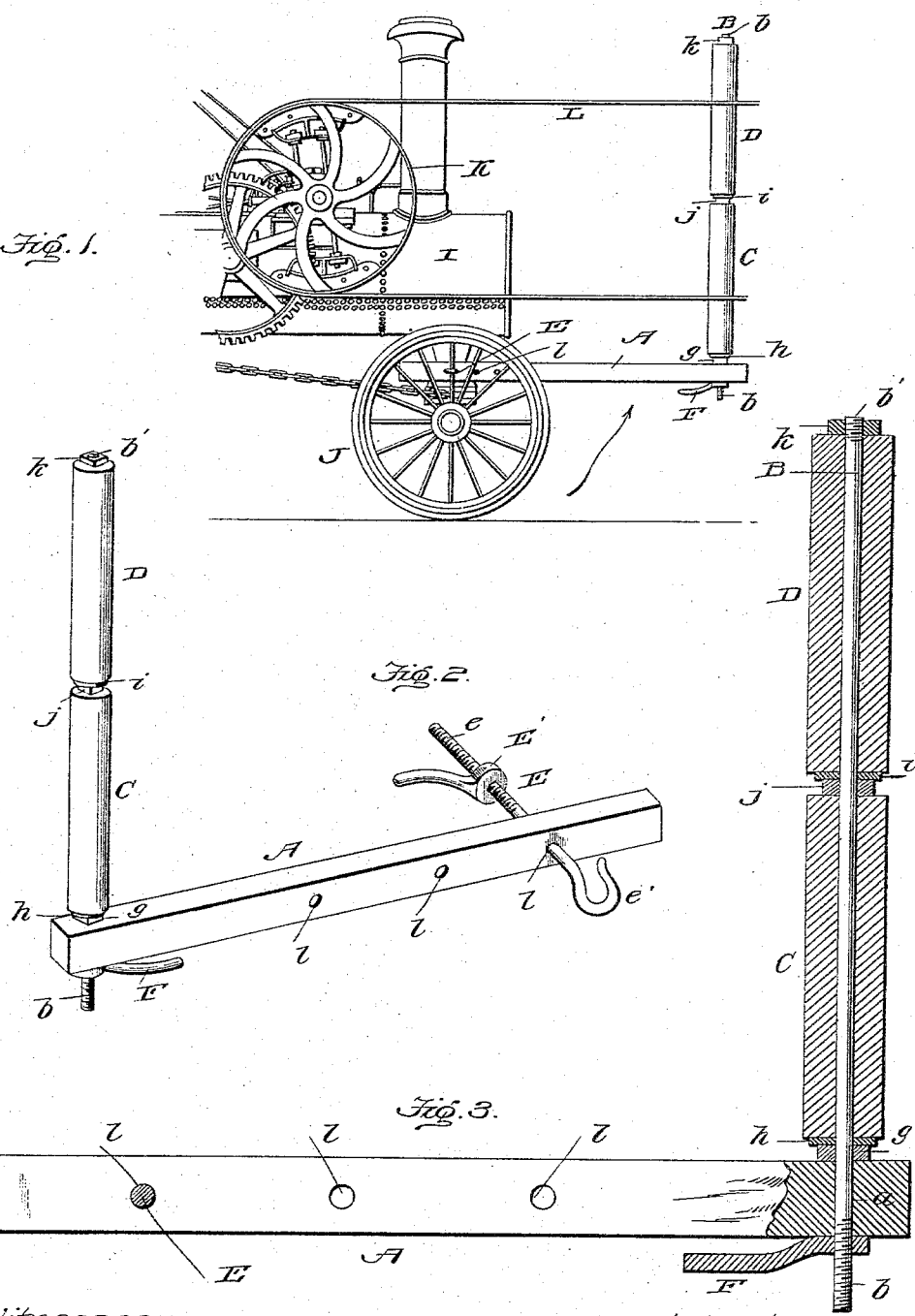

UNITED STATES PATENT OFFICE.

JOHN H. STAHL, OF HIGHVIEW, IOWA.

BELT-GUIDE FOR TRACTION-ENGINES.

SPECIFICATION forming part of Letters Patent No. 531,881, dated January 1, 1895.

Application filed September 25, 1894. Serial No. 524,095. (No model.)

*To all whom it may concern:*

Be it known that I, JOHN H. STAHL, a citizen of the United States, residing at Highview, in the county of Hamilton and State of Iowa, have invented certain new and useful Improvements in Belt-Guides for Traction-Engines; and I do hereby declare the following to be a full, clear, and exact description of the invention, such as will enable others skilled in the art to which it appertains to make and use the same.

This invention relates to a belt guide for traction engines so arranged that it will serve to hold the belt on the power pulley against the force of the wind blowing against one side of the belt; and the object that I have in view is to provide a simple and inexpensive contrivance which can be applied against either side edge of the belt and can be fastened to either side of the front truck wheel of the traction engine according to the direction from which the wind is blowing.

With these and such other ends in view as pertain to my invention, it consists in an upright spindle or arbor provided with loose rollers or pulleys to contact with the edges of the upper and lower sides of a belt running from a traction engine pulley to a thrashing machine, in combination with a supporting bar fastened at one end to the lower part of the upright spindle, and a clamp engaging with the other end of said supporting bar to hold the bar firmly in place on the front-truck-wheel of the traction engine; and the improvements further consist in the combination of devices, and in the construction and organization of parts which will be hereinafter fully described and claimed.

To enable others to understand my invention, I have illustrated the preferred embodiment thereof in the accompanying drawings, forming a part of this specification, and in which—

Figure 1 is an elevation of my belt guide applied to a traction-engine. Fig. 2 is a detail perspective view thereof, and Fig. 3 is a vertical sectional view of the same.

Like letters of reference denote like parts in all the figures of the drawings.

A denotes the supporting bar of my belt guide; B, the upright spindle or arbor; C, D, the guide rollers, and E the clamp by which the device is held or confined on the traction engine. One end of the supporting bar A is provided with a vertical aperture, $a$, through which is passed the lower threaded end, $b$, of the spindle or arbor B; and on this threaded end $b$ of the spindle is fitted a lower clamping nut F and an upper nut, $g$, whereby the nut F may be turned up against the lower side of the bar A to draw the nut, $g$, tightly against the upper side of said bar A and thus the spindle or arbor B is held firmly and securely in place on the outer end of the supporting bar A.

A collar or washer $h$ is fitted loosely on the spindle B to rest upon the nut $g$, and on this collar or washer $h$ is placed the lower end of the vertical roller C, which roller is formed with a longitudinal bore, passage or opening, to enable the roller to be fitted loosely on the spindle B and thus adapt the roller to turn freely on the spindle. A nut or collar $i$ is fastened in any suitable way, on the spindle about midway of the height thereof, and above the lower roller C. A loose washer, $j$, is fitted on the spindle to bear upon the middle fixed nut or collar $i$, and this loose washer, $j$, and fixed nut $i$ support the upper roller D at a suitable distance above the lower roller C. This upper roller D has a longitudinal bore, passage, or opening to enable it to be fitted loosely on the spindle B and to turn freely thereon, and the upper roller is prevented from slipping off the spindle by a nut $k$, secured on the threaded upper end $b'$ of the spindle B.

It will be observed that the two rollers C, D, are held at proper distances apart on the spindle B to bear against the edges of the upper and lower sides of the belt running from the traction engine to the thrashing machine, and that these rollers are made quite long to enable the belt to have a certain amount of play or movement and still remain in contact with the rollers of the guide. The rollers are loosely supported on the spindle so they can turn freely thereon and offer minimum resistance to the belt, thus reducing the friction owing to the contact of the belt and guide.

The supporting bar, A, is provided with one, or a series of transverse horizontal apertures $l$ to accomodate the clamp E. In the preferred embodiment of my invention, I employ a clamp to hold the belt guide on either side of the front truck-wheel of the traction engine. This clamp consists of a threaded stem or shank, e, formed into a hook e' at one end, and an adjusting nut E' provided with a handle for its convenient manipulation. The shank or stem of the clamp is passed through one of the horizontal apertures l in the bar A, the bar is applied against one side of the front truck wheel, the hook e' is adjusted around one of the spokes of said wheel, and the nut E' is tightened to draw the clamp and bar A tightly against one side of the truck wheel of said traction engine, whereby the belt guide is firmly clamped on the truck wheel.

In Fig. 1 of the drawings, I have shown a portion of the traction engine, in which figure the letter I indicates a part of the boiler; J, one of the front truck-wheels; K, the driving pulley, and L the belt which runs from the pulley K to and around a power pulley on a thrashing machine (not shown). I would have it understood that I do not confine the use of my belt guide to the type of engine herein shown, but reserve the right to use it on any kind of engine where the belt is liable to become displaced by the force of the wind or from other causes.

If the wind is blowing toward the right hand side of the engine, in the direction shown by the arrow in Fig. 1, the bar A is applied to the inside of the wheel J and held thereon by the clamp E so that the rollers C, D, are adapted to bear against the opposite or left hand side of the belt L, to prevent the latter from being blown off the pulley K. If the wind blows from the opposite direction and against the left hand side of the engine, the bar A is detached and applied against the outer side of the wheel J, so the rollers C, D, bear against the right hand edge of the belt L, the clamp E being adjusted to tightly hold the belt guide in place on the truck wheel of the engine. The clamp can be easily operated to permit the belt guide to be detached and reversed. The device is quite simple and durable in construction, efficient in operation, and can be manufactured at a small expense.

Having thus fully described my invention, what I claim as new, and desire to secure by Letters Patent, is—

1. A belt guide, substantially such as described, consisting of the supporting bar, A, a clamp, E, connected to one end of said bar and constructed to engage with a truck-wheel, the upright spindle B fastened to the other end of the bar, A, and rollers carried by said upright spindle, as and for the purposes described.

2. A belt guide, substantially as described, consisting of the supporting bar, A, a clamp, E, connected to one end of said bar, the upright spindle, B, having its lower threaded end fitted in the other end of said bar, A, clamping nuts, F, g, fitted on the threaded end of the spindle to hold the same upon the supporting bar, and loose rollers fitted on the spindle, as and for the purposes described.

3. A belt guide, substantially such as described, comprising the supporting bar, an upright spindle fastened to one end of said bar, the spaced rollers fitted loosely on the spindle, and a clamp E having its threaded stem or shank fitted in the bar and provided with a hook at one end of said stem and a nut on the threaded end thereof, as and for the purposes described.

In testimony whereof I affix my signature in presence of two witnesses.

JOHN H. STAHL.

Witnesses:
 JOHN L. KAMRAR,
 HARRIS S. KAMRAR.